United States Patent Office 3,389,300
Patented June 18, 1968

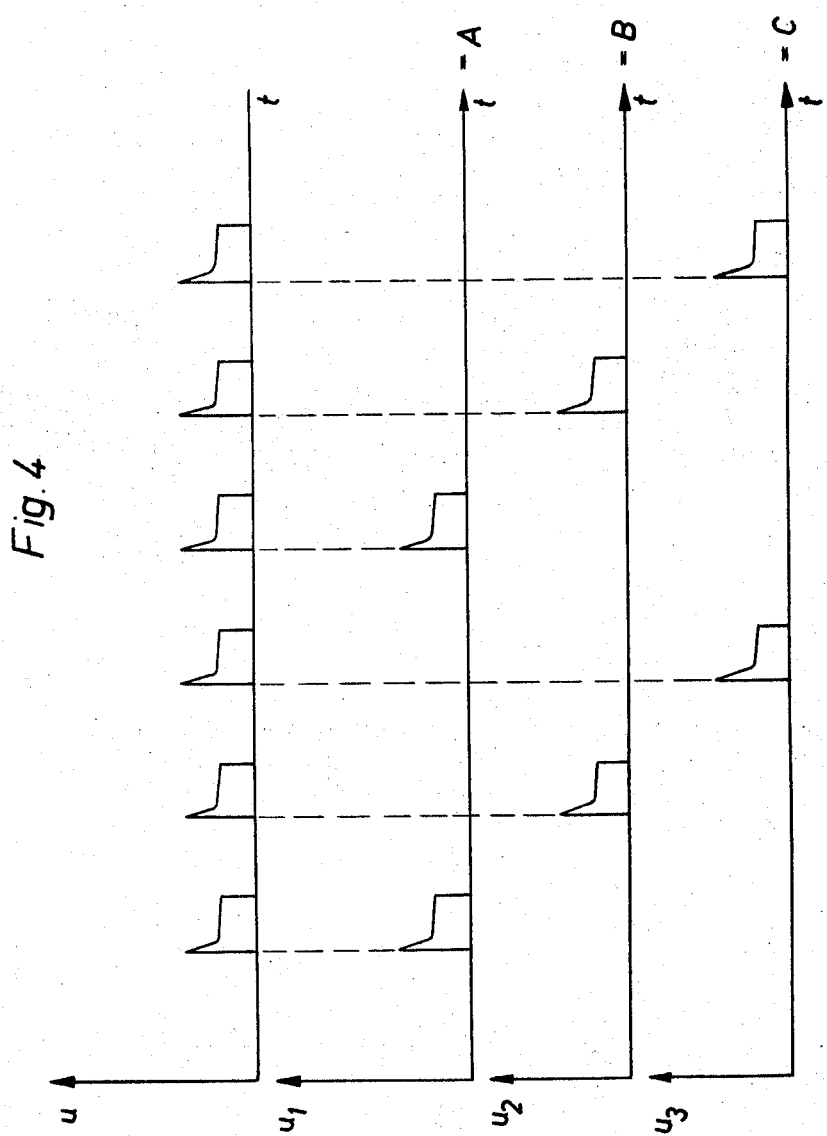

3,389,300
CIRCUIT FOR THE GENERATION OF WORKING PULSES IN ELECTRO-EROSIVE METAL WORKING MACHINES
Herbert Walter, Remscheid, Herbert Stichnote, Mainflingen, and Hans-Joachim Nilius, Seligenstadt, Germany, assignors to AEG-Elotherm G.m.b.H., Remscheid-Hasten, and Licentia Patent-Verwaltungs-G.m.b.H., Berlin-Grunewald, Germany
Filed Sept. 17, 1965, Ser. No. 488,165
Claims priority, application Germany, Sept. 18, 1964, A 47,103
2 Claims. (Cl. 315—227)

ABSTRACT OF THE DISCLOSURE

The following specification discloses a control circuit for the generation of working pulses in electro-erosive metal working machines which comprises a circuit having a controlled rectifier connected in series between the source of electrical energy and the working gap, which rectifier is fired at the desired pulsing frequency. A quenching circuit is provided to quench the controlled rectifier in the working circuit in such a manner as to control the duration of the working pulses. The quenching circuit comprises a first controlled rectifier for charging a capacitor and a second control rectifier for discharging the capacitor through a first inductor which is inductively coupled to a second inductor, which is connected in circuit with the controlled rectifier in the working circuit, the discharge of the capacitor thereby being effective to quench the pulses in the working circuit. A reactive circuit element is further provided to store voltage surges across the capacitor in the quenching circuit which stored voltage is subsequently used to provide an initial voltage peak on each working pulse.

---

The present invention relates to a circuit for the generation of working pulses for the electro-erosive machining of metals and more particularly to such circuits which make use of controlled semiconductor devices.

Pulse shape, pulse frequency and pulse length in such arrangements are of particular importance. The circuit used for the generation of the working pulses must not be affected by the nature of the load that depends on the width of the working gap. Known arrangements do not comply with this requirement or at least they do not meet the necessities of the case satisfactorily, particularly when short circuits occur in the working gap.

It is the object of the present invention to provide a circuit arrangement which is not open to these objections and to this end the invention provides in the circuit which contains the working gap a controlled semiconductor device, preferably in the form of a four-layer triode, which can be fired at intervals representing the desired pulse frequency and means for quenching the same through an inductive coupling comprising a four-layer triode and a capacitor, the latter being first charged through the four-layer triode and then discharged through the coupling inductance contained in the quenching circuit.

In order that the invention may be the more readily understood reference will hereinafter be made by way of example to the accompanying drawings in which:

FIG. 4 illustrates a pulse pattern which can be obtained with a circuit according to FIG. 3.

Figure 1:
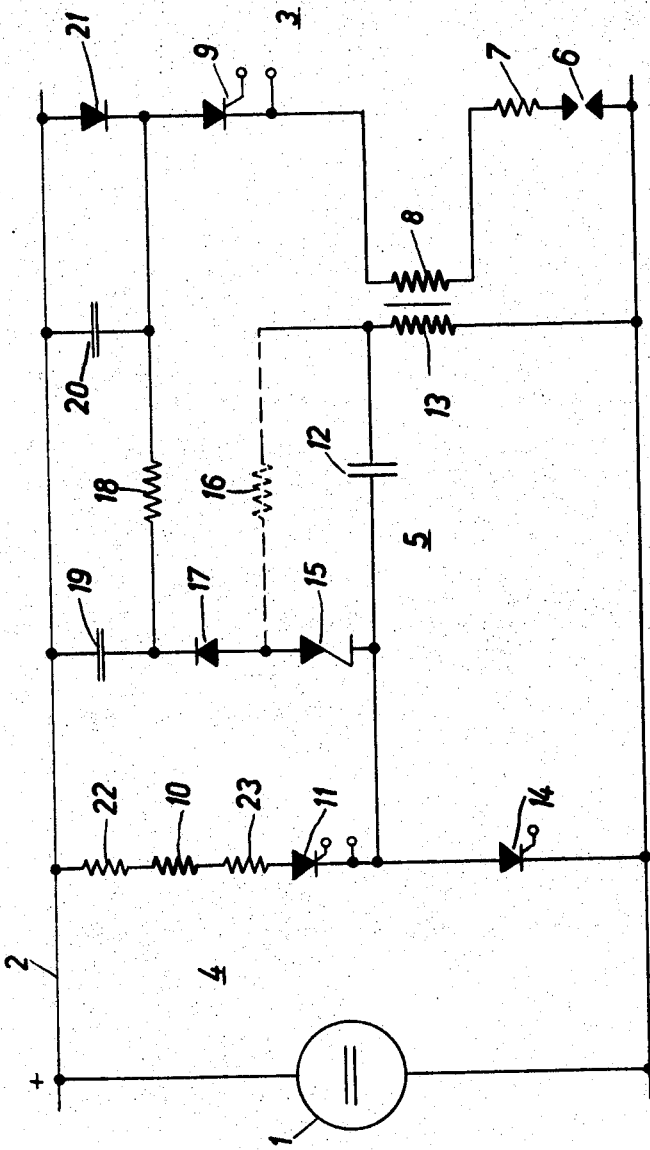
FIG. 1 shows a preferred circuit according to the invention.

Referring to FIG. 1 it will be seen that the circuit illustrated comprises two feeder conductors 2 connected to a source 1 of D.C. supply and supplying working circuit 3, charging circuit 4 and quenching circuit 5.

The working circuit 3 includes the working gap, i.e. the spark gap 6 of the erosion machine, as well as a series resistor 7, an inductance 8 and a four-layer triode 9.

The charging circuit 4 comprises an inductance 10 and a four-layer triode 11, a capacitor 12 and an inductance 13. The inductance 13 is inductively coupled with the inductance 8 in the working circuit 3.

The quenching circuit 5 comprises the capacitor 12, the inductance 13 and a four-layer triode 14.

This arrangement functions in that the four-layer triode 9 in the working circuit 3 and the four-layer triode 11 in the charging circuit 4 are simultaneously fired. This is done by a conventional pulse generating system which for the sake of simplicity is not specially shown in the drawing. Capacitor 12 is then charged through the conducting four-layer triode 11 in the charging circuit, triode 11 being quenched when the control current reverses and passes through zero. As soon as a discharge is initiated across the working gap 6, the working current is supplied through the conducting four-layer triode 9. At the end of the prescribed duration of the pulse the four-layer triode 14 in the quenching circuit 5 is fired. Consequently capacitor 12 will discharge and quench the four-layer triode 9 by the opposing E.M.F. induced in the working circuit by the coupled inductances 13 and 8. By a suitable choice of the characteristics of capacitor 12 and of the coupling between the two inductances 13 and 8 it is possible to ensure that the opposing E.M.F. in the working circuit 3 will stop the continued flow of current in conducting direction through triode 9. Contrary to circuits known in the art the proposed arrangement prevents the occurrence of a voltage rise at the working gap. Consequently the trailing flank of the pulse will have a steep downward slope. The object of resistor 7 is to limit the working current during operation and in the case of short circuits.

Conveniently the capacitor 12 in the quenching circuit 5 is associated with a damping member to prevent the four-layer triodes from being exposed to excessive potential loads and thus to avoid the necessity of providing controlled rectifiers capable of withstanding very high voltages. To this end a non-linear resistor with a preferably discontinuous characteristic is provided at 15, such as a selenium rectifier operating in reverse (such devices are available on the market under the name "Thyrector" and made by the General Electric Co.). This device diverts overvoltages and thus ensures that the energy stored in the capacitor will always rise to a predetermined level irrespectively of pulse frequency and pulse length.

The overvoltage which is diverted through element 15 can be discharged through a resistor, as indicated in broken lines at 16. However, the overvoltage can be usefully employed for the purpose of generating a potential peak in the working circuit 3 when the four-layer triode 9 strikes. To this end a diode 17 and a resistor 18 are provided in a connecting line to the working circuit 3. Moreover, capacitors 19 and 20 are interposed between this overvoltage diversion and one of the feeder conductors 2. Any overvoltage that has been diverted through element 15 will therefore charge the capacitors 19 and 20, since the flow of current is blocked by diode 21 and the non-conducting four-layer triode 9. However, when the four-layer triode 9 strikes, the two capacitors 19 and 20 must discharge through the working circuit 3 since the discharge is blocked by diode 21. When the discharge of capacitor 20 has been completed the working current can flow through diode 21.

Figure 2:
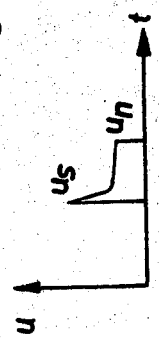
FIG. 2 illustrates the pulse shaped obtained with a circuit according to FIG. 1.

The working pulse that can thus be achieved roughly has the shape illustrated in FIG. 2. The graph shows that a voltage peak $U_s$ first develops at the leading end of the the pulse but immediately falls to a voltage $U_n$ which corresponds to the supply voltage of the source at 1. Naturally this voltage peak can be arranged to be more or less steep according to the circuit elements that are used. However, the presence of the voltage peak provides the necessary voltage for initiating the discharge across the working gap. The normal supply voltage and hence the power loss across the input resistor may therefore be reduced.

Figure 3:
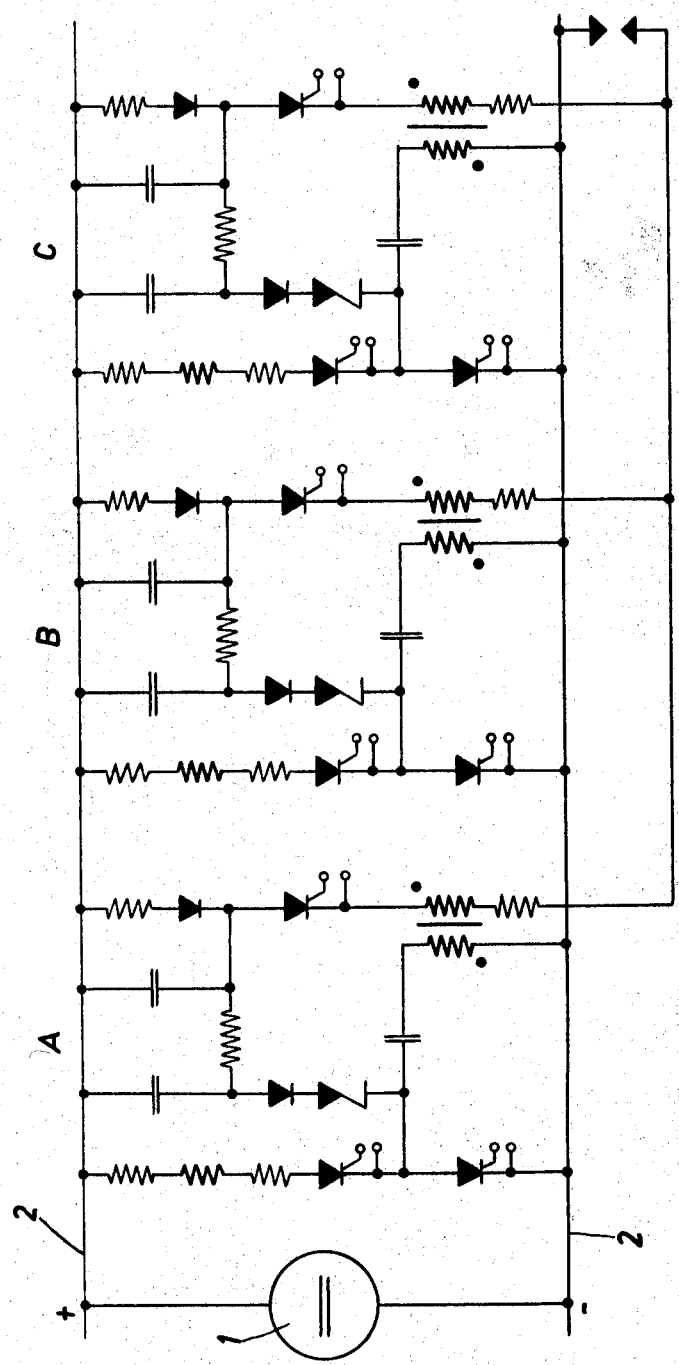
FIG. 3 shows a plurality of circuits according to FIG. 1 arranged in parallel to pulse a single working gap.

Networks of the kind proposed by the present invention can be connected in parallel and associated with the same working gap in the manner illustrated in FIG. 3. In the illustrated arrangement three networks A, B, C, all constructed as shown in FIG. 1, are provided. Naturally, it would be possible similarly to combine two or more than three such networks in parallel. If the triodes in the three networks are controlled to operate with a displacement of phase the pulse sequence supplied to the working gap will be as illustrated in FIG. 4. The pulse sequences of the several networks are represented by A, B and C so that the pulse sequence at the working gap will be as represented by the upper line in the graph. It will be understood that this permits the pulse frequency at the working gap to be raised without exceeding the admissible power loss in the four-layer triode of each of the three networks. In this method of operation it is advisable to provide damping in the charging circuits 4 of the several networks by the provision of a resistor 22 (FIG. 1), for the purpose of reducing the power loss through the four-layer triode 11. In the event of a short circuit resistor 22 limits the current through the four-layer triodes 11 and 14 and a short-circuit cut-out may be provided to rupture the current before the fuse at 23 blows. This provides for the necessary safety of operation.

It is also possible to control the several networks to pulse the working gap simultaneously, i.e. to control the triodes in phase. This permits high erosive performance to be achieved and the equipment can be controlled in this particular way for roughing. The change-over from phase displaced to in-phase operation can be easily effected and the plant can thus be readily used first for rough machining and then for finishing operations.

Equipment comprising a control network for the phase displaced operation of the networks may be operated with advantage in such a way that the intervals between consecutive pulses in each network are utilised for charging the capacitor 12 of the charging circuit in the network concerned. This has the advantage that more time is available for charging and that the load on triode 11 is reduced. Moreover, the duration of the pulse is not restricted by the time needed for charging, permitting a shorter pulse length and a higher pulse frequency to be achieved.

When the networks are arranged to pulse the working gap in phase it is best to control the triodes in such a way that the operation of the four-layer triode 9 in the working circuit 3 lags behind that of the four-layer triode 11 in the charging circuit 5. This permits the capacitor 12 to accept a higher charge even if the electrodes in the working gap 6 should be in contact when the plant is switched on.

What we claim is:

1. A circuit for the generation of working pulses in electro-erosive metal working machines comprising a working gap, a controlled semi-conductor device connected in series with said working gap for pulsing said gap, which semi-conductor device is adapted to be fired at intervals corresponding to the desired pulse frequency, quenching means for quenching pulses from said semi-conductor device at the end of the desired duration thereof, said quenching means comprising a four layer triode, a capacitor, inductor means inductively coupled to said controlled semi-conductor device, means for charging said capacitor through said four layer triode and means for discharging said capacitor through said inductor means for quenching the pulses from said controlled semi-conductor, and damping means comprising a non-linear resistor which operates in a blocking direction connected to said capacitor for damping the quenching means by diverting overvoltages and wherein said non-linear resistor is further connected through a diode to a reactive storage means for storing said overvoltages, and means for coupling said reactive storage means to said controlled semi-conductor device to thereby cause a voltage peak when said controlled semi-conductor device is fired.

2. A circuit for the generation of working pulses in electro-erosive metal working machines having a working gap, comprising first and second terminals adapted to be connected to a source of electrical energy, a controlled semi-conductor device for pulsing said gap, first indicator means, means connecting said semi-conductor device and first inductor means in series between said first terminal and said working gap, quenching means comprising a capacitor, a four-layer triode for charging said capacitor and a second inductor means inductively coupled to said first inductor means, said capacitor, four-layer triode and second inductor being connected in series between said first and second terminals, said quenching means further comprising switching means connected across said capacitor and second inductor means for discharging said capacitor through said second inductor means to quench said controlled semi-conductor device, and damping means comprising a non-linear resistor having one terminal connected to said capacitor, the other terminal of said non-linear resistor being connected through a diode to a reactive storage element, said non-linear resistor being disposed to pass voltage surges across said capacitor above a predetermined value to said reactive storage element and means connecting said reactive storage element in circuit with said working gap and controlled semi-conductor device for providing an initial voltage peak when said controlled semi-conductor device is fired to pulse said working gap.

References Cited

UNITED STATES PATENTS

| | | | |
|---|---|---|---|
| 3,163,782 | 12/1964 | Ross. | |
| 3,205,378 | 9/1965 | Kline. | |
| 3,280,367 | 10/1966 | Poerschke | 315—227.1 |
| 3,300,683 | 1/1967 | Weishaar | 315—227.1 |

FOREIGN PATENTS

| | | |
|---|---|---|
| 1,058,653 | 6/1959 | Germany. |

JOHN W. HUCKERT, *Primary Examiner.*

J. D. CRAIG, *Assistant Examiner.*